J. C. WATSON.
STRAP FOR MOUNTING EYEGLASSES.
APPLICATION FILED OCT. 26, 1915.

1,234,429.

Patented July 24, 1917.

Inventor
Joseph Calhoun Watson
by Walter E. Ward
Atty.

UNITED STATES PATENT OFFICE.

JOSEPH CALHOUN WATSON, OF ALBANY, NEW YORK.

STRAP FOR MOUNTING EYEGLASSES.

1,234,429.   Specification of Letters Patent.   Patented July 24, 1917.

Application filed October 26, 1915. Serial No. 58,072.

*To all whom it may concern:*

Be it known that I, JOSEPH CALHOUN WATSON, a citizen of the United States, residing at the city of Albany, in the county of Albany and State of New York, have invented certain new and useful Improvements in Straps for Mounting Eyeglasses, of which the following is a specification.

My invention relates to means for mounting lenses in eyeglass and spectacle frames, and the objects of my invention are to provide straps which may be used for mounting rimless lenses upon nose pieces for eyeglasses and frames for spectacles, without any screws passing through the lenses, and at the same time provide a secure and economical method of mounting the lenses upon the nose pieces and spectacle frames, without any cement or screws, in a safe and secure manner, so that they may be readily removed without injury, and without danger of breaking, and hold the lenses safely without danger of their becoming loose or dropping out.

Other objects of my invention will appear later in the specifications.

I accomplish these objects by means of the mechanism illustrated in the accompanying drawings, in which—

Similar numerals refer to similar parts throughout the several views.

The nose pieces for eyeglasses and the frame for spectacles are often attached to the lenses by screws passing through the lenses. The lenses are frequently broken by these screws being screwed down too tightly.

Figure 1:
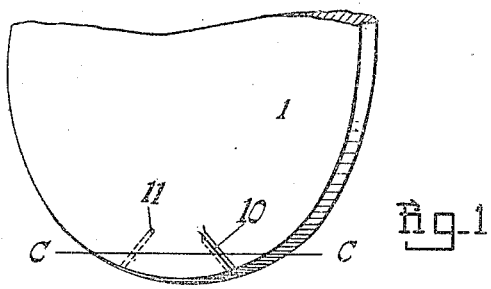
Figure 1 is a perspective view of a lens showing the grooves for holding my strap.

I attach these mountings without having any screws penetrate through the lenses or coming in direct contact with them. I provide grooves on each side of the lenses, as shown in Fig. 1. I make these grooves upon an angle, converging toward the center from the edges of the lenses, so that the strap when attached in the grooves can not be taken therefrom by direct force longitudinal or up and down with either of the grooves.

Referring to the drawings, 1 represents the lens to be mounted in the spectacle frames or nose pieces for eyeglasses, 2 is my strap as a whole for attaching the lens to the frames or nose pieces, 3 is the top fold of my strap, 4 is the middle fold and 5 is the last or third fold of my strap, 6 is a lug attached to the under side of the first fold and adapted to fit in a corresponding groove in the lens, 7 is a lug or projection attached to the upper side of the bottom or last fold 5 of the strap and is similar to the lug 6 attached to the bottom of the upper fold and is adapted to fit in a groove in the lens on the opposite side from the groove in which the lug 6 enters, 8 is a rivet adapted to hold the top fold of the strap snugly against the middle fold of the strap so that lug 6 will be in its proper groove in the lens and will hold the lugs securely in their proper grooves, 9 is a spring wire located on the top surface of the first fold of the strap and attached to, or made a part of, the rivet 8 to hold the top fold next to the middle fold, as described. The spring wire which holds the first fold and lug down when it is in the recess, passes through the first and second folds of the strap and is riveted with a cam on the under side of the second or middle fold. When the lens is to enter the strap or to be taken out of it, the spring wire is swung around off of the first fold and this top fold springs out releasing and drawing out the lug of first fold, which is inserted in the groove on that side of the lens. In mounting a lens, the spring wire is swung around off of the first or top fold, as shown by dotted positions in both Figs. 6 and 11, and the lug slid off of the third or bottom fold into the lens groove on that side, then the top or first fold is pushed down so the lug of this top fold will be inserted into the groove on that side of the lens, and the spring wire is swung back into its recess or groove on the top side of the first fold, and the lens will be held and locked in the strap securely and firmly, without cement or screw, and will not allow the lens to get loose or wabbly. The rivet 8 may be provided with a recess for the screw driver, or with the spring wire 9, as desired. When the spring wire 9 is used the top fold is somewhat depressed, forming a recess or bed for the wire to lie in when the strap is attached to the lens, as will be hereafter fully explained. 10 is a groove in the upper surface of the lens, 11 is a groove in the opposite surface of the lens.

Figure 4:
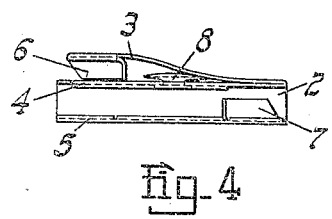
Fig. 4 is a front elevation of same, not mounted on lens.
Figure 2:
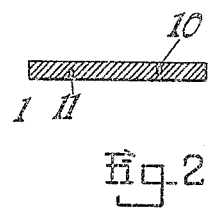
Fig. 2 is a section of the same upon lines CC, Fig. 1.
Figure 5:
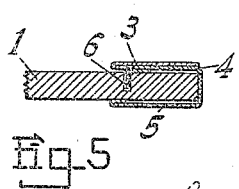
Fig. 5 is a sectional view of a portion of the lens with my strap attached thereto on lines AA, Fig. 3.
Figure 9:
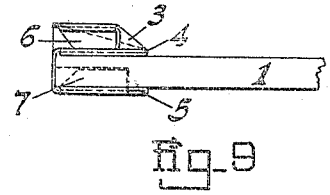
Fig. 9 is an end elevation of my strap showing lens in position but not clamped to strap.

I make my strap preferably from one piece in three folds, the lens entering between the last fold, and the middle fold coming in contact with the upper side of the last fold and the lower side of the middle fold. I construct a lug or projection, as 6, Figs. 4 and 5, upon the lower side of the first fold of the strap. One of the lugs enters a groove on one side of the lens and a lug or projection enters in a groove on the other side of the lens, as 7 in Fig. 7. Both of the grooves may be on the same side of the lens, but I preferably put one groove on each side of the lens for the purpose of better security.

The lugs are made at each end of the strap in the following manner: The metal is bent around and folded under the edge on one side at the end and on the inside of the strap and the lug is formed, or is projected, a very short distance from the edge of the fold, underneath, at either end, or on the inside of the strap, so that the top edges of the grooves in the lens will be entirely covered by the overlapping ends or edges of the strap. It is very important that the top edges of both grooves in the lens should be thoroughly covered by the metal strap which laps over past the edges of the grooves in the lens, so as to prevent the dust and dirt from collecting in the lens grooves, as well as prevent anyone from seeing these grooves when the lens is thoroughly mounted into the strap.

Figure 3:
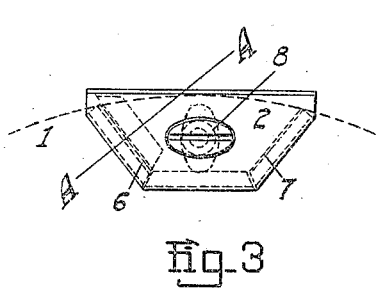
Fig. 3 is a plan view of my strap showing the lens in dotted lines.
Figure 10:
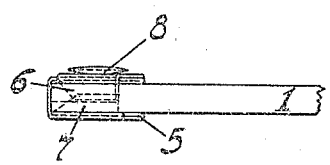
Fig. 10 is an end elevation of my strap showing lens clamped in place.

I make the strap in three folds so as to have the projections on the third fold enter the groove in the lens, so that the strap may readily be slid in position on the lens, and then the top fold clamped down to the projection upon the under side of that fold entering into its groove in the lens and the two holding the lens firmly. The projection upon the bottom or third fold enters into one of the grooves in the lens and the other projection being upon the top or first fold will not interfere with this movement. Then when the folds of the strap are pressed together upon the lens the lug or projection will be firmly held in the grooves. The folds may be held together by a rivet, as shown in Figs. 3 and 10, which rivet may be operated as a screw, or by a spring wire, as shown in Figs. 6, 7, 8 and 11.

Figure 6:
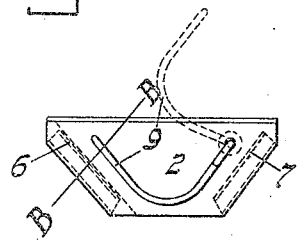
Fig. 6 is a plan view of one method of attaching my strap to the lens.
Figure 7:
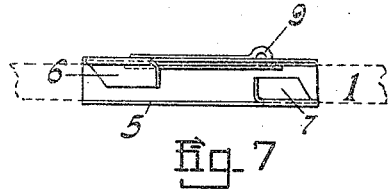
Fig. 7 is a front elevation of the modified form of attaching my strap to the lens, showing lens dotted in place.
Figure 11:
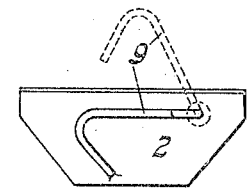
Fig. 11 is a plan view of my strap with a spring wire for holding the sides against the glass shown in dotted line when the spring wire is raised from the side of the strap.
Figure 8:
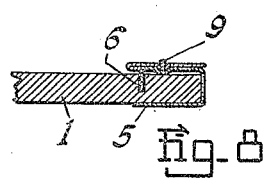
Fig. 8 is a sectional view of the modified form of attaching the strap to a lens on lines BB, Fig. 6.

The rivet head may have a slot, the same as an ordinary screw, to be operated by a screw driver. The rivet will pass through the two folds of the strap and one end of the rivet should have a cam, so when the rivet is turned by a screw driver the thicker portion of the cam will press against the side of the fold pressing the two folds together. One side of the fold may be made thicker in one place for a portion of the cam to turn against, bringing the two sides of the fold securely together. The rivet, if desired, may be attached to or form a part of the spring wire, as shown in Figs. 6, 7 and 11. This wire when turned in position will rest in recesses provided in the upper side of the first fold of the strap. These recesses have depressions extending into the second fold of the strap, as shown in Fig. 8, so that when the spring wire is sprung into position it will lie in the recess of the outer fold and will at the same time spring the lug entering the recess into the groove in the recess in the second fold next to the side of the lens in a secure manner.

Made in this way my strap will require no screws penetrating through the lenses and will require no cement to hold the lenses in place. It may be quickly and securely attached to the lenses and the lenses may be extracted by the operator quickly, as may be desired.

What I claim as my invention and desire to secure by Letters Patent is—

1. In a device of the class described, a strap for mounting a lens upon a nose piece or spectacle frame consisting of three folds adapted to receive the lens between the bottom fold and the next upper fold, a lens with grooves in the surfaces thereof adapted to enter between the lower fold and the next upper fold, a lug upon the upper surface of the bottom fold adapted to enter into one of the grooves of the lens, a lug on the lower surface of the upper fold adapted to enter into another groove in the surface of said lens, a rivet extending through the two upper folds of said strap, a cam attached to the end of said rivet adapted to bear against each of said upper folds whereby said rivet will be adapted to hold said folds pressed against each other and the said lugs pressed into the grooves of said lens.

2. In a device of the class described, a strap for mounting a lens upon a nose piece or spectacle frame consisting of one continuous piece bent into three folds, said folds adapted to receive the lens between the bottom fold and the next upper fold, a lens adapted to enter between said lower fold and next upper fold, grooves in the surface of said lens adapted to receive lugs therein, a lug upon the upper surface of the lowest fold adapted to enter into a corresponding groove in said lens, a lug upon the under surface of the top fold adapted to enter into a corresponding groove in said lens, a rivet extending through the two upper folds, a spring wire attached to one end of said rivet adapted to operate said rivet, and depressions in the surface of each of said folds adapted to retain said spring wire.

3. A device of the class described, consisting of a strap for mounting a lens upon a nose piece or spectacle frame consisting of three folds and adapted to receive and retain a lens between the lowest fold and the next upper fold, a lens adapted to enter in between said folds, grooves in the surfaces of said lens adapted to receive lugs attached to said folds, a lug on the upper surface of the lowest one of said folds adapted to enter into a corresponding groove in said lens, a lug upon the under surface of the top one of said folds adapted to enter into a corresponding groove in said lens, a rivet extending through the upper two of said folds, a cam attached to the end of said rivet adapted to bear against the upper side of the topmost of said upper folds whereby said rivet will be adapted to hold said fold firmly pressed against each other and said lugs in the grooves of said lens, said lugs so located upon said folds as to leave a margin between each respective lug and edge of said fold whereby the edge of the grooves in said lens will be covered over when said lugs are entered into said grooves, substantially as described and for the purposes mentioned.

In testimony whereof I affix my signature in presence of two witnesses.

JOSEPH CALHOUN WATSON.

Witnesses:
 WALTER J. WARD,
 MINNIE MONTANYE.

Copies of this patent may be obtained for five cents each, by addressing the "Commissioner of Patents, Washington, D. C."